United States Patent Office.

IMPROVED METHOD OF PREPARING PEAT AND OTHER SUBSTANCES FOR FUEL.

LOUIS S. ROBBINS, OF NEW YORK, N. Y.

Letters Patent No. 60,248, dated December 4, 1866.

SPECIFICATION.

TO ALL WHOM IT MAY CONCERN:

Be it known that I, LOUIS S. ROBBINS, of the city, county, and State of New York, have invented a new and improved Method of Preparing Peat, Coal-Dust, and other Substances for Fuel; and I do hereby declare that the following is a full, clear, and exact description thereof, which will enable others skilled in the art to fully understand and make use of the same.

My invention consists in drying and preparing peat, coal-dust, and other substances, either separately or in combination, so that the material employed shall be economically and uniformly mixed and combined during the process of drying, and at the same time furnishing to the material employed, highly concentrated and adhesive substances. It is well known that efforts have been made from time to time to mix and combine coal, tar, and similar substances, with peat and coal-dust by mechanical means, but the nature of peat is such that all efforts to do this with any degree of uniformity or economy have hitherto failed. After many experiments, I have ascertained that the subtle nature of hot oleaginous vapors, obtained from coal, tar, bitumen, rosin, &c., will when properly applied permeate and saturate large quantities or bodies of those substances in a most thorough, uniform, and economical manner. I will now proceed to describe my process.

I place the peat, coal-dust, or other substances, either separately or in combination, in a receiver of any suitable size and form, and connect the receiver with a still or retort containing coal-tar, wood-tar, bitumen, rosin, or any other oleaginous substance or compounds; I then raise the heat in the still or retort sufficiently high to cause the vapors to rise from the contents, and pass through and permeate every portion of the peat, coal-dust, or other substance contained in the receiver. The heat of the vapor will at first expel any moisture contained in the peat or other substance. The water or watery vapor will pass through a pipe attached to the receiver for the purpose; the outer end of the pipe will be submerged in water for the purpose of condensing any of the oleaginous vapor which might escape with the moisture. The heat is continued until the contents of the receiver are sufficiently saturated with the vapor, and are in a suitable condition to be moulded or pressed into blocks. When operating with coal-dust, the heat of the vapor is sufficient to soften it to such a degree, that when pressed the blocks are quite solid and retain their form while being consumed in the fire. The vapors produced from coal, tar, bitumen, rosin, and substances of like nature, on cooling, become very adhesive and render the material when pressed into blocks solid and tenacious, and the condensed vapor being uniformly distributed through the mass, the fuel is highly combustible and concentrated, and greatly superior to any fuel hitherto produced from similar substances. When peat or other substances are prepared for domestic use, and consumers do not require a concentrated fuel, saturated with bituminous substances, and when it is only necessary that the material should be dried and pressed, I fill my retort with pieces of broken marble or any similar material, which will present an extended heating surface; I then raise the temperature in the retort to any required degree, (a red heat if necessary,) and force a current of air through it, and into and through the material to be dried, (peat or other substance,) by a bellows or in some other manner, which readily expels the moisture. I do not limit myself to any particular kind or form of apparatus, as I am aware that there are many ways by which the operation can be performed. Nor do I confine myself to the methods herein described of expelling the moisture by the use of the hot vapors or by heated air.

But having thus described my invention, what I do claim as new, and desire to secure by Letters Patent, is—

Saturating peat, coal-dust, or other substances, either separately or in combination with hot oleaginous vapors, substantially as herein described.

I also claim the drying and saturating the peat, coal-dust, or other substances, either separately or in combination, at one and the same operation, substantially as described.

I also claim the method herein described of drying the peat, coal-dust, or other substances, by the use of heated air, substantially as herein described.

The above specification of my invention signed by me this 13th day of October, 1866.

LOUIS S. ROBBINS.

Witnesses:
WM. F. McNAMARA,
ALEX. F. ROBERTS.